W. A. DICK.
COOLING MEANS FOR DYNAMO ELECTRIC MACHINES.
APPLICATION FILED AUG. 8, 1908.
1,034,890. Patented Aug. 6, 1912.
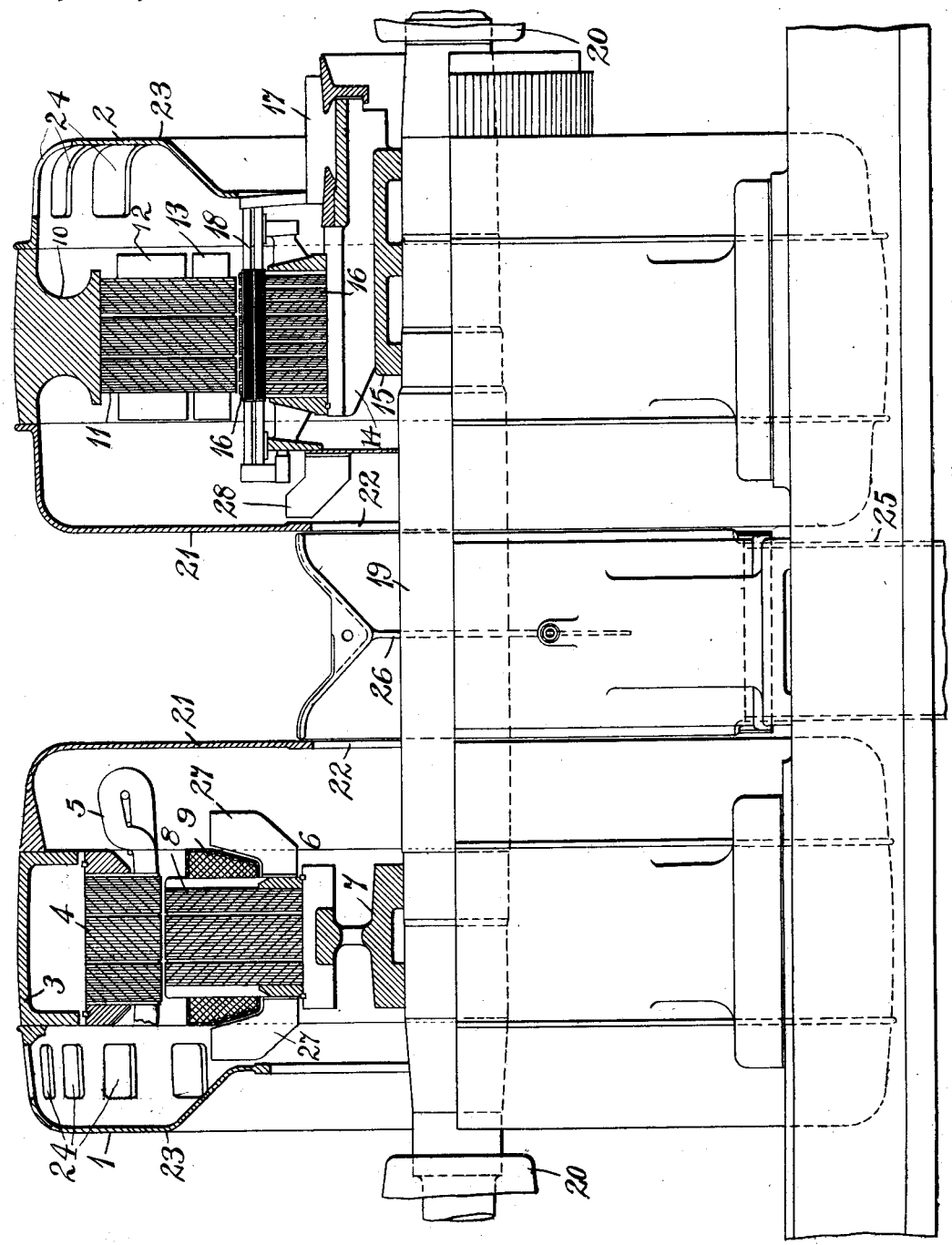

UNITED STATES PATENT OFFICE.

WILLIAM A. DICK, OF PITTSBURGH, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

COOLING MEANS FOR DYNAMO-ELECTRIC MACHINES.

1,034,890.     Specification of Letters Patent.     Patented Aug. 6, 1912.

Application filed August 8, 1908. Serial No. 447,574.

*To all whom it may concern:*

Be it known that I, WILLIAM A. DICK, a citizen of the United States, and a resident of Pittsburgh, in the county of Allegheny and State of Pennsylvania, have invented a new and useful Improvement in Cooling Means for Dynamo-Electric Machines, of which the following is a specification.

My invention relates to dynamo-electric machines and it has special reference to motor generator sets or to similar combinations in which two or more machines of this character are operated relatively close together in parallel planes.

The object of my invention is to provide means for cooling the magnetically and electrically active parts of machines of the aforesaid class that shall be simple in construction and effective in operation.

When two dynamo-electric machines of approximately the same size are operated near together or side by side in parallel planes, as is the case with motor generator sets, the volume of air which is located between the two machines is not very great and tends to rotate with the movable parts of the machines without permitting the necessary renewals for maintaining low temperatures.

The usual tendency for the air to move around the common shaft between the two machines which are rotated at the same speed, is entirely overcome by the arrangement of my present invention, according to which cool air is taken in at some convenient point between the machines or at a considerable distance from the machines and is directed into corresponding inclosing casings or end bells which are disposed on the adjacent sides of the two machines.

The single figure of the accompanying drawing is a view, partially in elevation and partially in section, of a motor generator set provided with my improved cooling means.

Referring to the drawing an alternating current generator 1 is here shown direct-connected to a direct current motor 2, these machines being intended to be illustrative of any similar combination of dynamo-electric machines. The alternating current generator 1 comprises the usual stationary frame 3, a laminated armature core 4, a winding 5 associated therewith and a rotatable member 6 comprising a spider 7, magnetizable polar projections 8 and coils 9. The direct current motor 2 comprises a stationary field magnet frame 10 having polar projections 11 and shunt and series field magnet windings 12 and 13, the rotatable member 14 of this machine being composed of a spider 15, an armature core 16, a commutator cylinder 17 and a winding 18 of well known types.

The rotatable members of both machines are mounted on a common shaft 19 which is supported in bearings 20 and the adjacent ends of the stationary frames are provided with inclosing end bells 21 which are similar to each other and are provided with annular openings 22 adjacent to the shaft through which cool air may be circulated. The outer ends of the machines are also provided with end bells 23 but these are unlike those which are located on the inner ends of the machines in that they are provided with a plurality of holes 24 adjacent to the stationary frames to which they are secured, through which the air, that is received through the openings 22, may escape after it is circulated through the active parts of the machine, as hereinafter pointed out.

Between the two machines, and surrounding the shaft, is a flue or pipe 25 having its outer end open and preferably extending into the outside atmosphere, so that it is adapted to conduct cool air to the machines 1 and 2. The portion of the flue 25 which is located between the machines near the openings 22 is provided with a longitudinal partition 26 which divides the air equally, or in any other desired proportions, between the two machines. The circulation of air in the flue may be established either by a fan or blower (not shown), or by any other suitable means located in it, or by fan blades carried by the rotatable members of the machines.

As illustrated in the drawings, the alternating current generator 1 is provided with radial blades 27 which force the air outwardly through the openings in the end bell 23 and the rotating armature of the direct current motor is similarly provided with vanes 28 which create the desired circulation of air in this direction.

It is evident that structural modifications may be effected within the spirit and scope of my invention and I desire that only such limitations shall be imposed as are indicated in the appended claims.

I claim as my invention:

The combination with two dynamo-electric machines having rotatable members relatively near together and operated in parallel planes, fan or blower members secured to the rotatable members, and inclosing casings for the machines having inlet ports near the axis of the movable members on the adjacent sides of the machines and outlet ports near their peripheries on non-adjacent sides of the machines, of a common inlet pipe or flue located between the machines and having a partition for determining the proportions of cooling fluid that shall be supplied to the respective machines.

In testimony whereof, I have hereunto subscribed my name this 31st day of July, 1908.

WILLIAM A. DICK.

Witnesses:
M. STELLA FLEISHER,
BIRNEY HINES.

Copies of this patent may be obtained for five cents each, by addressing the "Commissioner of Patents, Washington, D. C."